(12) United States Patent
Wang et al.

(10) Patent No.: US 10,185,120 B2
(45) Date of Patent: Jan. 22, 2019

(54) MOVEMENT CONTROL APPARATUS FOR HELIOSTAT DEVICE

(71) Applicants: Chengwei Wang, Oak Hills, CA (US); Zhiming Wang, Oak Hills, CA (US)

(72) Inventors: Chengwei Wang, Oak Hills, CA (US); Zhiming Wang, Oak Hills, CA (US)

(*) Notice: Subject to any disclaimer, the term of this patent is extended or adjusted under 35 U.S.C. 154(b) by 79 days.

(21) Appl. No.: 15/157,144

(22) Filed: May 17, 2016

(65) Prior Publication Data

US 2017/0102056 A1    Apr. 13, 2017

Related U.S. Application Data

(60) Provisional application No. 62/241,066, filed on Oct. 13, 2015.

(51) Int. Cl.
*G02B 7/183* (2006.01)
*F24S 30/422* (2018.01)
*F24S 30/452* (2018.01)
*F16H 25/20* (2006.01)
*F24S 30/00* (2018.01)

(52) U.S. Cl.
CPC ............ *G02B 7/183* (2013.01); *F24S 30/422* (2018.05); *F24S 30/452* (2018.05); *F16H 2025/2043* (2013.01); *F24S 2030/11* (2018.05); *F24S 2030/13* (2018.05); *F24S 2030/19* (2018.05); *Y02E 10/47* (2013.01)

(58) Field of Classification Search
CPC ............. F16H 25/20; F16H 2025/2043; G02B 26/0816; G02B 7/183
See application file for complete search history.

(56) References Cited

U.S. PATENT DOCUMENTS

| 3,640,140 | A  | * | 2/1972  | Gulick ............... F16H 25/2204 |
|           |    |   |         | 74/89.38 |
| 4,354,396 | A  | * | 10/1982 | Charles .................. F16H 25/20 |
|           |    |   |         | 74/104 |
| 9,745,762 | B2 | * | 8/2017  | Moran ................ E04G 21/3228 |
| 2013/0021214 | A1 | * | 1/2013 | Zimmerman ........... H01Q 3/08 |
|           |    |   |         | 343/761 |
| 2015/0093947 | A1 | * | 4/2015 | Nanjo .................... B63H 25/24 |
|           |    |   |         | 440/6 |
| 2015/0236410 | A1 | * | 8/2015 | Zimmerman ........... H01Q 3/08 |
|           |    |   |         | 343/761 |
| 2016/0145881 | A1 | * | 5/2016 | Moran ................ E04F 11/1865 |
|           |    |   |         | 182/113 |
| 2017/0335583 | A1 | * | 11/2017 | Moran ............... E04G 21/3228 |
| 2017/0356202 | A1 | * | 12/2017 | Moran ............... E04F 11/1865 |

* cited by examiner

*Primary Examiner* — Victor L MacArthur
(74) *Attorney, Agent, or Firm* — Che-Yang Chen; Law Offices of Scott Warmuth

(57) ABSTRACT

A movement control apparatus for a heliostat device may include a step motor, a decelerating motor, a ball screw assembly, a nut, a connecting shaft, and a linear moving shaft. In one embodiment, the nut is movably connected with the ball screw assembly and is secured on a first connecting board and a second connecting board through the connecting shaft. The nut is driven by the ball screw assembly to travel along the screw shaft and since the nut is connected to the connecting boards through the connecting shaft, and the connecting boards are connected to the moving shaft, the movement of the nut can further drive the connecting shaft to rotate to drive the moving shaft to move in a linear manner on the sliding rail to rotate a mirror assembly of the heliostat around a post.

7 Claims, 6 Drawing Sheets

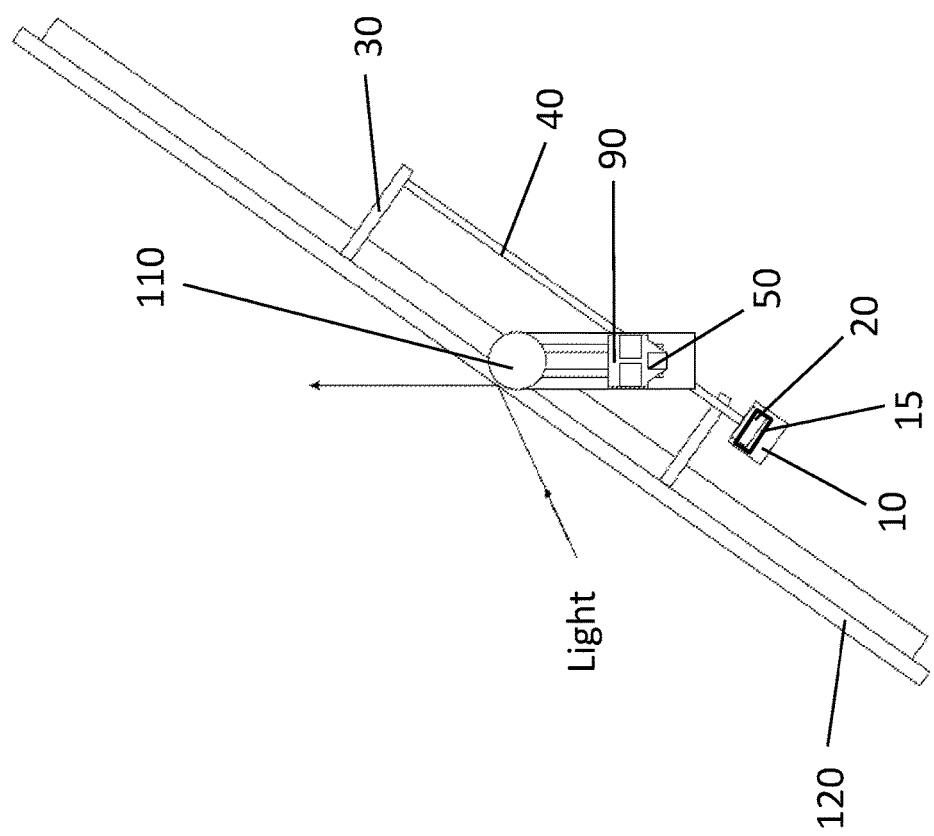

MOVEMENT CONTROL APPARATUS FOR HELIOSTAT DEVICE

CROSS-REFERENCE TO RELATED APPLICATIONS

This application claims priority under 35 U.S.C. § 119 (e) to U.S. Provisional Patent Application Ser. No. 62/241,066, filed on Oct. 13, 2015, the entire contents of which are hereby incorporated by reference.

FIELD OF THE INVENTION

The present invention relates to a heliostat device for a solar power panel, and more particularly to a movement control mechanism of the heliostat device.

BACKGROUND OF THE INVENTION

Solar power generation technology, which converts solar energy into heat and then converts heat into electricity by focusing solar energy and collecting heat, is one of the most prospective solar energy utilization modes, and a heliostat is used for focusing and reflecting sunlight.

More specifically, the heliostat is a mirror device for locating the sunlight on a target accurately, and is usually used as a beam-condensing component in a solar illuminating apparatus or a solar thermal power generation system. In a tower-solar thermal power generation system, the sunlight is reflected by a heliostat assembly comprising a plurality of heliostats to a collector mounted on top of a receiving tower to obtain focused solar energy, so the solar heat radiation can be reflected by a number of heliostats to a solar receiver mounted on top of a high tower, to heat the medium to produce superheated steam, or to directly heat water in the heat collector to produce superheated steam, which then drives the turbo-generator set to generate electricity, thus converting solar energy into electrical energy. To enable the solar radiation to be reflected onto the fixed receiver by reflectors at all times during the day, a movement control mechanism must be provided for the heliostat device.

However, current movement control mechanism may be disadvantageous because current movement control mechanism is either programmed or controlled by sensors, which is difficult to operate or respond to the light. More importantly, mechanical errors may be generated and accumulated to adversely affect the positioning of the heliostat device. Therefore, there remains a need for a new and improved design for a precise position or movement control apparatus for the heliostat device to overcome the problems presented above.

SUMMARY OF THE INVENTION

It is an object of the present invention to provide a movement control apparatus to better position a heliostat device.

It is another object of the present invention to provide a movement control apparatus for a heliostat device to eliminate mechanical errors that may be generated during the movement thereof.

It is a further object of the present invention to provide a "three-point" rigid structure including two supporting frames and a ball screw secured on the supporting frames to significantly reduce mechanical errors.

In one aspect of the present invention, a movement control apparatus for a heliostat device may include a step motor, a decelerating motor, a ball screw assembly, a nut, a connecting shaft, and a linear moving shaft. In one embodiment, the nut is movably connected with the ball screw assembly and is secured on a connecting board through the connecting shaft. The movement control apparatus may further include two supporting frames to firmly secure both ends of the ball screw assembly.

When in use, the step motor may be triggered by a sensor on the mirror assembly, and is then decelerated by the decelerating motor to generate a greater torque applied to the ball screw assembly to drive the screw shaft to rotate. The nut is then driven by the ball screw assembly to travel along the screw shaft. Since the supporting frames and the ball screw assembly forms a rigid "three-point" structure, the torque received by the ball screw assembly can be almost completely transformed to the energy for the nut to travel along the screw shaft. Meanwhile, the nut is connected to the connecting board through the connecting shaft, and the connecting board is connected to the moving shaft, so the movement of the nut can further drive the moving shaft to move in a linear manner on the sliding rail.

BRIEF DESCRIPTION OF THE DRAWINGS

FIG. 1 is a schematic view of the position control apparatus of the heliostat device in the present invention.

DETAILED DESCRIPTION OF THE INVENTION

Figure 1A:
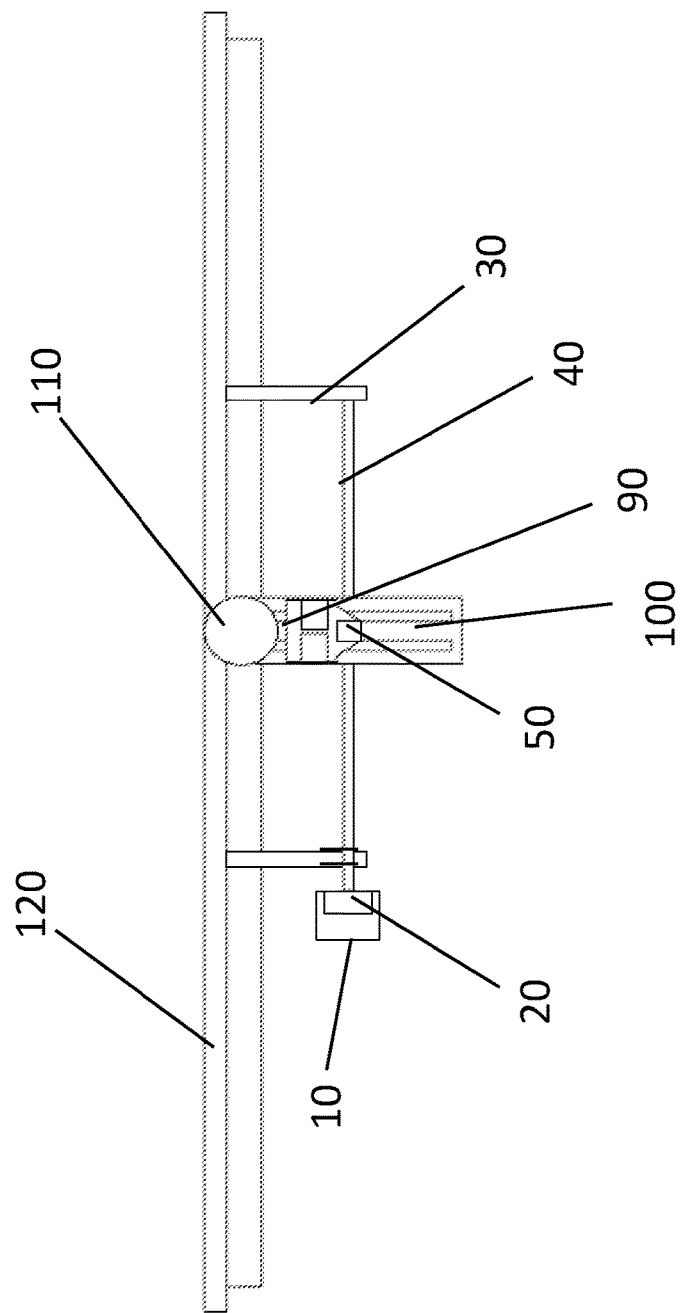
FIG. 1a is a schematic view of the position control apparatus of the heliostat device in the present invention configured to change the angle of the panel.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

A conventional heliostat device usually includes a mirror assembly with a plurality of frontal mirrors facing the sun; an elevation angle adjusting mechanism to drive the mirror assembly to rotate around a horizontal axis to adjust the elevation angle of the mirror assembly; an azimuth angle adjusting mechanism to drive the mirror assembly to rotate around a vertical axis to adjust the azimuth angle of the mirror assembly; a sensor facing the mirror assembly and sends out elevation angle controlling signals and azimuth angle controlling signals to control the reflecting direction of the mirror assembly; and a post which fixedly stands on the ground and integrally supports the mirror assembly. The elevation angle adjusting mechanism and the azimuth angle may be collectively referred to a movement control mechanism.

When in use, the mirror assembly of the heliostat turns to keep reflecting sunlight toward a predetermined target, compensating for the sun's apparent motions in the sky. The turning of the mirror assembly is controlled by the movement control mechanism. More specifically, the reflective surface of the mirror is kept perpendicular to the bisector of the angle between the directions of the sun and the target as seen from the mirror. In almost every case, the target is stationary relative to the heliostat, so the light is reflected in a fixed direction.

In one aspect of the present invention, referring to FIGS. 1 to 4, a movement control apparatus for a heliostat device may include a step motor 10, a decelerating motor 20, a ball screw assembly 40, a nut 50, a connecting shaft 70, a linear moving shaft 90 configured to slide on a sliding rail 100, a post 110 and a mirror assembly 120. In one embodiment, the step motor 10 and the decelerating motor 20 are electrically connected through a connector 15, and the nut 50 is movably connected with the ball screw assembly 40 and is secured on a first connecting board 60 and second connecting board 80 through the connecting shaft 70 that is configured to rotate to drive the linear moving shaft 90. The movement control apparatus may further include two supporting frames 30 to firmly secure both ends of the ball screw assembly 40. The mirror assembly may include a horizontal bar 130 in a perpendicular manner with the post 110 at all time.

As discussed above, one of the disadvantages of conventional movement control mechanism is mechanical errors, which may be generated and accumulated to adversely affect the positioning of the heliostat device. To overcome this disadvantage, the present invention provides the ball screw assembly 40 that includes a screw shaft 41 made of metal and includes a helical ball groove 42 formed therein. The ball screw assembly 40 is known for precision positioning. It is noted that both ends of the screw shaft 41 of the ball screw assembly 40 are firmly secured by two supporting frames 30, so a "three-point" rigid structure including two supporting frames 30 and the ball screw assembly 40 are formed to significantly reduce mechanical errors that may be generated and accumulated during the movement of the screw shaft 41, so the heliostat device can be more precisely positioned. The ball screw assembly 40 in the present invention can also be used as a power transmission interface between the screw rod and screw nut.

When in use, the step motor 10 may be triggered by a sensor (not shown) on the mirror assembly 120, and is then decelerated by the decelerating motor 20 to generate a greater torque applied to the ball screw assembly 40 to drive the screw shaft 41 to rotate. The nut 50 is then driven by the ball screw assembly 40 to travel along the screw shaft 41. Since the supporting frames 30 and the ball screw assembly 40 forms a rigid "three-point" structure, the torque received by the ball screw assembly 40 can be almost completely transformed to the energy for the nut 50 to travel along the screw shaft 41. Meanwhile, the nut 50 is connected to the first connecting board 60 and second connecting board 80 through the connecting shaft 70 that is configured to rotate to drive the linear moving shaft 90, and the first connecting board 60 and second connecting board 80 are connected to the moving shaft 90, so the movement of the nut 50 can further drive the moving shaft 90 to move in a linear manner on the sliding rail 100 through the movement of the rotating movement of the connecting shaft 70.

Figure 1B:
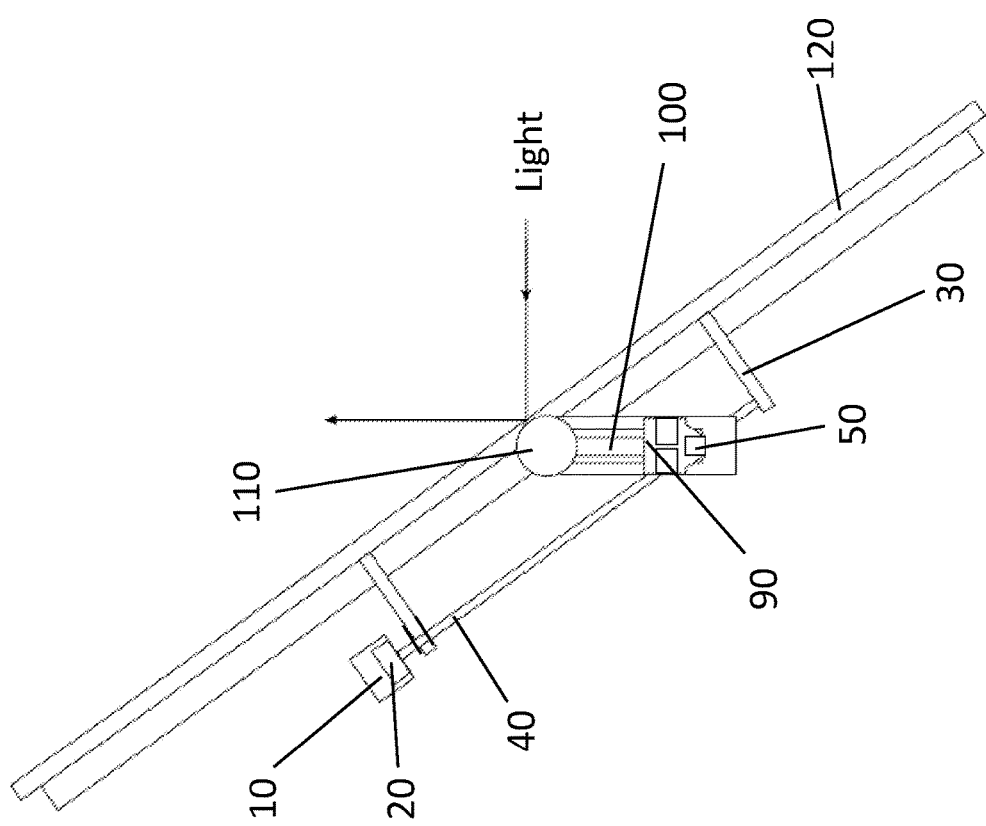
FIG. 1b is another schematic view of the position control apparatus of the heliostat device in the present invention configured to change the angle of the panel.
Figure 2:
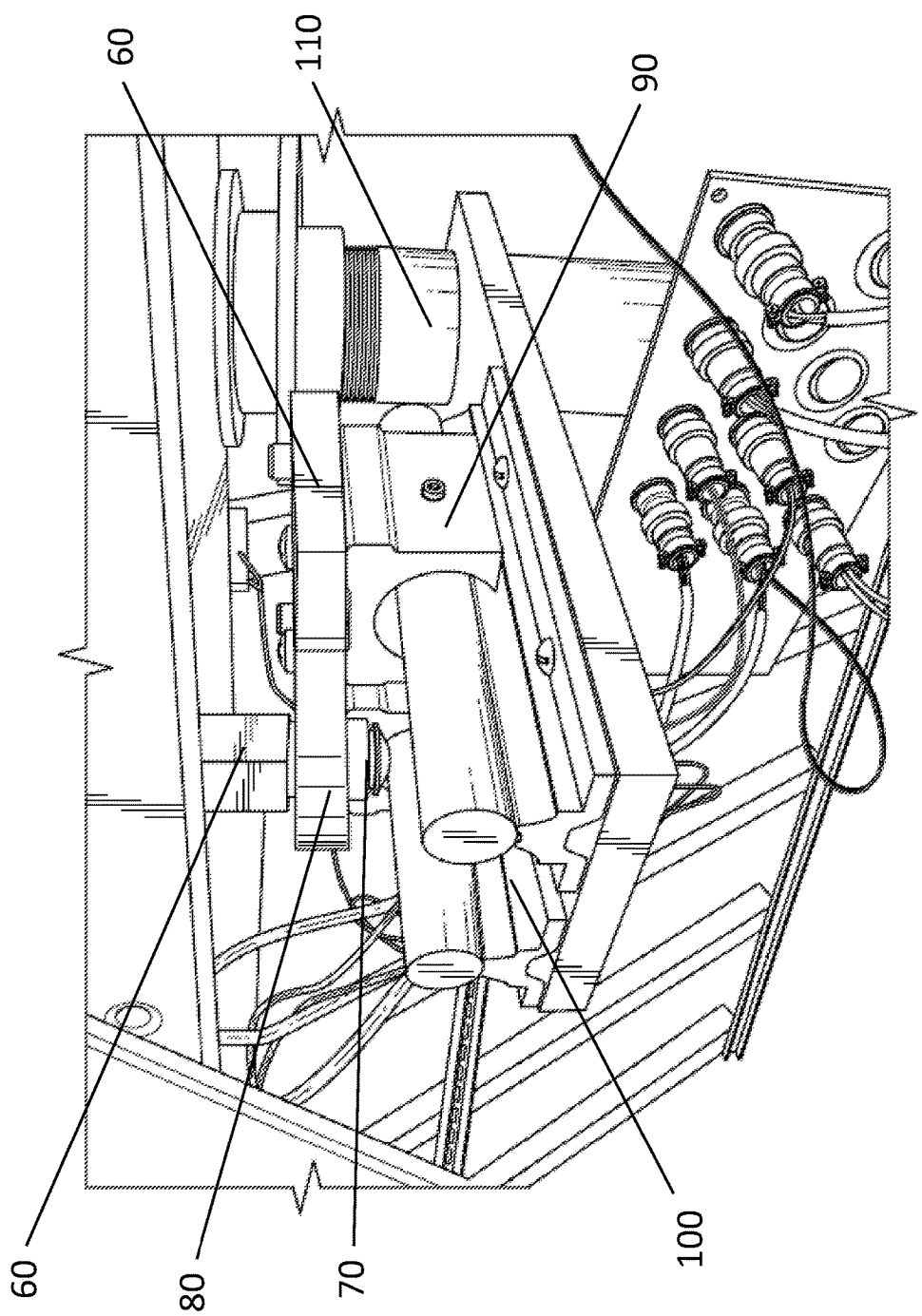
FIG. 2 is a schematic view of the linear moving shafts on the sliding rails in the present invention.
Figure 3:
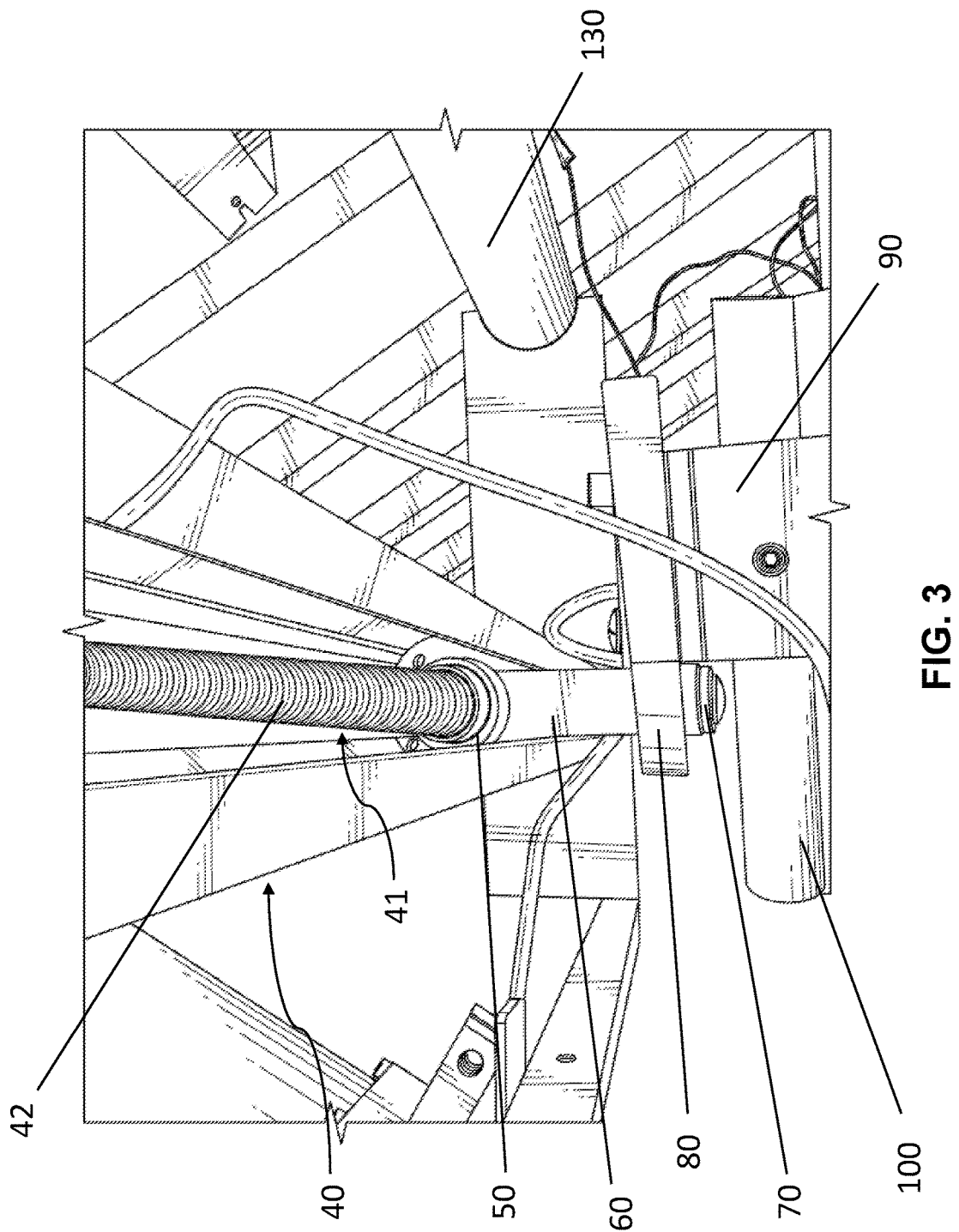
FIG. 3 is a schematic view of the ball screw in the present invention.
Figure 4:
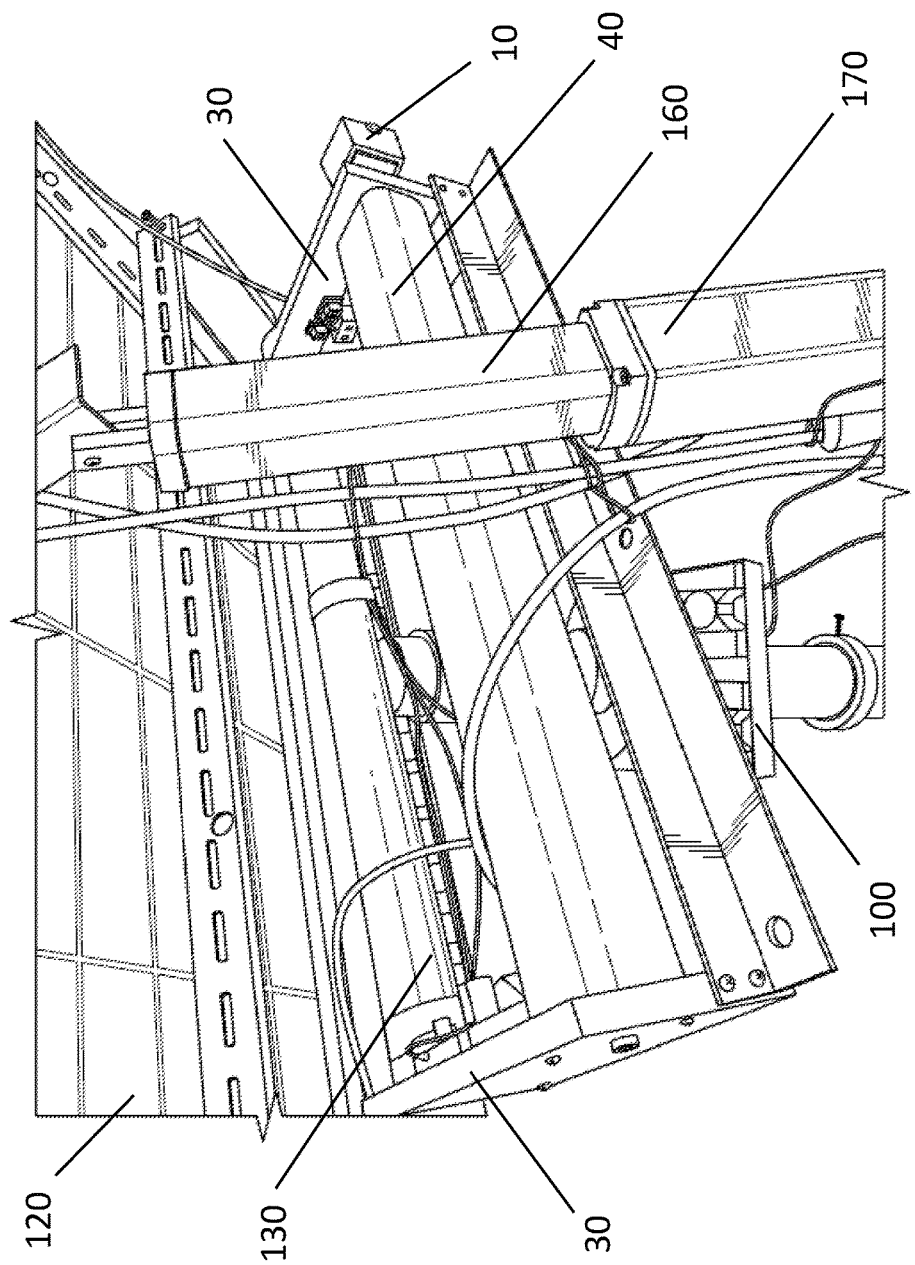
FIG. 4 is a schematic view of the position control apparatus connected with the panel in the present invention.

More specifically, as can be seen in FIG. 1, the nut 50 is located close to the step motor 10 at the beginning and when the ball screw assembly 40 starts to rotate, the nut 50 travels along the screw shaft 41 of the ball screw assembly 40 as shown in FIGS. 1a and 1b. Since the nut 50 is connected to the first connecting board 60 and second connecting board 80 through the connecting shaft 70, and the connecting board 60 is connected to the moving shaft 90, the movement of the nut 50 is configured to provide a momentum to drive the moving shaft 90 to travel along the sliding rail 100 and further rotate the mirror assembly 120 along a post 110. It is important to note that the movement of the mirror assembly can be considered a combination of the angular movement of the connecting shaft 70 directly driven by the nut 50 and the linear movement the moving shaft 90.

Still referring to FIGS. 1, 1a and 1b, the ball screw assembly 40 is parallel to the mirror assembly 120, and when the screw shaft 41 is rotating to drive the nut 50 to move thereon, the angle between the ball screw assembly 40 and the sliding rails 100 changes, as well as the distance change between the nut 50 and the post 110. It is also noted that the movement control in the present invention focuses on the "azimuth angle adjusting mechanism," namely the rotation of the mirror assembly 120 around a vertical axis (e.g. the post 110) to adjust the azimuth angle. An elevation angle of the mirror assembly 120 can also be adjusted through a supporting bar 160 and a motor assembly 170 including a a step motor and a decelerating motor (not shown).

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A movement control apparatus for a heliostat device comprising:
   a motor assembly;
   a ball screw assembly having a screw shaft with helical grooves;
   a nut movably connected to the screw shaft and configured to travel thereon, and connected to a first connecting board and a second connecting board through a connecting shaft;
   a linear moving shaft connected to the connecting board and configured to slide on a sliding rail;
   wherein the motor assembly is triggered to generate a torque to drive the screw shaft to rotate and further drive the nut to travel on the screw shaft, and the movement of the nut is configured to provide a momentum to drive the connecting shaft that is configured to rotate to drive the moving shaft to travel along the sliding rail because of the connection through the first and second connecting boards and further to rotate a mirror assembly of the heliostat device along a post, wherein the movement of the mirror assembly is caused by an angular movement of the connecting shaft directly driven by the nut and the linear movement the moving shaft.

2. The movement control apparatus for a heliostat device of claim 1, wherein the motor assembly includes a step motor and a decelerating motor, and the step motor and the decelerating motor are electrically connected through a connector.

3. The movement control apparatus for a heliostat device of claim 1, further comprising two supporting frames to firmly secure both ends of the ball screw assembly to form a rigid three-point structure.

4. The movement control apparatus for a heliostat device of claim 3, wherein when the screw shaft is rotating to drive the nut to move thereon, an angle between the ball screw assembly and the sliding rail is changing accordingly.

5. The movement control apparatus for a heliostat device of claim 3, wherein when the screw shaft is rotating to drive the nut to move thereon, a distance between the nut and the post is changing accordingly.

6. The movement control apparatus for a heliostat device of claim 1, wherein when the screw shaft is rotating to drive the nut to move thereon, an angle between the ball screw assembly and the sliding rail is changing accordingly.

7. The movement control apparatus for a heliostat device of claim 1, wherein when the screw shaft is rotating to drive the nut to move thereon, a distance between the nut and the post is changing accordingly.

* * * * *